United States Patent
Patton et al.

(10) Patent No.: US 9,668,418 B2
(45) Date of Patent: Jun. 6, 2017

(54) AGRICULTURAL COMBINE WITH WINDROW CONTROL CIRCUIT

(71) Applicant: DEERE & COMPANY, Moline, IL (US)

(72) Inventors: Stephen Michael Patton, Rock Island, IL (US); James K Adamson, Colona, IL (US); John L Peters, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 428 days.

(21) Appl. No.: 14/041,717

(22) Filed: Sep. 30, 2013

(65) Prior Publication Data
US 2015/0089912 A1    Apr. 2, 2015

(51) Int. Cl.
*A01D 41/127* (2006.01)
*A01D 57/28* (2006.01)
*A01D 41/12* (2006.01)

(52) U.S. Cl.
CPC .......... *A01D 57/28* (2013.01); *A01D 41/1243* (2013.01)

(58) Field of Classification Search
CPC ....... A01D 57/00; A01D 41/127; A01D 57/28
USPC ............ 460/1, 8, 149, 111, 112; 56/10.2 R, 56/10.2 A, 192; 701/50
See application file for complete search history.

(56) References Cited

U.S. PATENT DOCUMENTS

| 4,646,757 | A | 3/1987 | Schmitt et al. |
| 6,729,953 | B2* | 5/2004 | Bueermann ............. A01F 12/40 460/112 |
| 8,010,262 | B2* | 8/2011 | Schroeder .......... A01D 41/1243 701/50 |
| 8,282,312 | B2* | 10/2012 | Braddy ................ E01C 19/182 404/108 |
| 8,635,840 | B2* | 1/2014 | Behnke ................ A01D 41/127 460/1 |
| 2010/0242427 | A1* | 9/2010 | Anstey .................. A01F 15/106 56/341 |
| 2011/0302897 | A1* | 12/2011 | Hoffman ................ A01D 43/10 56/192 |
| 2014/0096498 | A1* | 4/2014 | Estock .................... A01D 43/06 56/192 |
| 2014/0171160 | A1* | 6/2014 | Ricketts ............. A01D 41/1243 460/1 |
| 2015/0253427 | A1* | 9/2015 | Slichter .................. G01C 21/20 356/5.01 |
| 2015/0379721 | A1* | 12/2015 | Good .................... G06T 7/0075 348/47 |

FOREIGN PATENT DOCUMENTS

| EP | 0685151 A1 | 12/1995 |
| EP | 1514466 A2 | 3/2005 |
| EP | 2042018 A1 | 4/2009 |

(Continued)

OTHER PUBLICATIONS

European Search Report issued in counterpart application No. 14181138.0, dated Mar. 4, 2015 (5 pages).

(Continued)

*Primary Examiner* — John G Weiss

(57) ABSTRACT

An agricultural combine (100) has a windrow control circuit that controls the profile of windrow (154) based upon signals received from a sensor (152).

16 Claims, 5 Drawing Sheets

(56) References Cited

FOREIGN PATENT DOCUMENTS

| | | |
|---|---|---|
| RU | 2129358 C1 | 4/1999 |
| RU | 2355155 C2 | 5/2009 |
| WO | 2011012953 A1 | 2/2011 |

OTHER PUBLICATIONS

EA Search Report issued in counterpart application No. 201400951, dated Feb. 5, 2015 (2 pages).

* cited by examiner

AGRICULTURAL COMBINE WITH WINDROW CONTROL CIRCUIT

FIELD OF THE INVENTION

This invention relates to agricultural combines. More particularly, it relates to agricultural combines configured to form windrows behind the agricultural combine. Even more particularly, it relates to devices for sensing and correspondingly shaping the windrow as it is deposited by the combine.

BACKGROUND OF THE INVENTION

Agricultural harvesters cut crop material from the field, and separated into grain and non-grain components. Non-grain components, often called straw, or more generally MOG (material other than grain) is deposited on the field either to enrich the soil, or to be subsequently gathered and harvested in a second harvesting operation. The separate harvesting operations may comprise baling, or gathering the windrow together and blowing it into a bin or wagon.

Often windrows are deposited on the field and are later harvested, sometimes days later. This time interval is often provided to permit the MOG in the windrow to dry out. Furthermore, some gathering processes are sensitive to the amount of moisture in the MOG. If the MOG is too moist, or too dry, the baling process may be unsatisfactory. For this reason, leaving the MOG in the field in the form of windrows for a period of time can improve the formation of the bales.

In order to dry out properly, it is beneficial to make windrows having a specific shape or contour. A consistent thickness and height is beneficial because it permits the windrow to dry uniformly. A consistent width of the windrow over the width of the windrow is beneficial because it permits bales (particularly round bales) to be formed evenly and consistently.

If the thickness or height of the windrow on one side is greater than the thickness or height of the windrow on the other side, the bale can be bound tightly on one side and loosely on the other side, permitting the loose material to fall out of the bale.

Typically, the shape of the windrow is controlled by steering mechanisms variously called flaps, gates, and vanes that are disposed in the flow of MOG that will leave the combine. The steering mechanisms direct the MOG onto the ground in windrows. The shape of the windrows is at least partially defined by the orientation of the steering mechanisms.

During the day as harvesting proceeds, however, the characteristics of the MOG may change. Typically, the operator is unable to monitor the profile (e.g. the shape) of the windrow from in the operator's cabin of the agricultural combine. Agricultural combines are not commonly provided with cameras that view behind them. Furthermore, even if cameras giving the operator a rear view are provided, the fast-moving, two-dimensional image that can be seen on the screen of a monitor in the operator's cabin does not provide enough two-dimensional detail to indicate to the operator the profile of the windrow he is creating.

Even if the operator is aware that the harvesting conditions have changed and the windrow contours are less than optimal, it is not easy for the operator to make adjustments to the shape of the windrow as the agricultural combine is traveling through the field.

The steering mechanisms are typically manually adjusted at the rear of the vehicle. Therefore, in order to change their settings, the operator must stop the agricultural combine, dismount the vehicle, walk to the rear of the vehicle, loosening bolts or other fasteners holding the steering mechanisms in place, adjust them, and then return to the operator's cabin and restart the agricultural combine. This process is long, drawn out, and even worse, does not necessarily fix the problem, since the operator made the corrections while the agricultural combine was not moving.

As a result, the operator, on return to the operator's cabin, may see on the screen of his monitor that the corrections he made to the steering mechanisms were incorrect. However, in order to make further corrections, he must repeat this entire process of exiting the vehicle, adjusting the steering mechanisms, and returning to the cabin.

For these reasons, operators of agricultural combines are loath to adjust the steering mechanisms that change the profile of the windrow.

What is needed therefore is an improved arrangement for monitoring the profile of the windrow, and adjusting the steering mechanisms that change the windrow profile. It is an object of this invention to provide such an arrangement.

SUMMARY OF THE INVENTION

In accordance with a first aspect of the invention, an agricultural combine having a windrow control circuit, is provided, the agricultural combine comprising: a self-propelled harvesting vehicle configured to harvest crops, separate grain from MOG, and deposit MOG on ground in a windrow; a sensor mounted on the self-propelled harvesting vehicle, wherein the sensor is configured to sense a profile of the windrow; at least one steering vane disposed to deflect a flow of the MOG leaving the self-propelled harvesting vehicle; at least one actuator coupled to the at least one steering vane to move the at least one steering vane relative to the self-propelled harvesting vehicle and deflect the flow of the MOG leaving the self-propelled harvesting vehicle; and at least one ECU coupled to the sensor and coupled to the at least one actuator; wherein the at least one ECU is configured to receive data indicative of a profile of the windrow, wherein the at least one ECU is configured to perform a comparison of the data indicative of the profile of the windrow and at least one parameter defining a reference windrow profile, and wherein the at least one ECU is configured to drive the at least one actuator in response to the comparison.

The sensor may be selected from a group comprising a camera, a laser line scanner, and a scanning laser rangefinder.

The at least one ECU may be further configured to extract at least one parameter from the data indicative of the profile of the windrow, and further wherein the at least one parameter is selected from a windrow thickness or height and a windrow width.

The at least one actuator may be configured to at least vertically deflect the flow of the MOG.

The at least one actuator may be configured to at least horizontally deflect the flow of the MOG.

The at least one parameter defining a reference windrow profile may be selected from a group comprising a windrow thickness or height and a windrow width.

The at least one parameter defining a reference windrow profile may comprise a first windrow thickness or height and a second windrow thickness or height.

The at least one ECU may be configured to change the at least one parameter defining the reference windrow profile in response to changes in the data indicative of a profile of the windrow.

The at least one parameter defining the reference windrow profile may be selected from a group comprising a windrow thickness or height and a windrow width.

The at least one steering vane may comprise a first plurality of steering vanes that are configured to deflect the flow of the MOG in a primarily horizontal direction.

The first plurality of steering vanes may be independently positionable by the at least one ECU.

The first plurality of steering vanes may be disposed on opposing horizontal sides of the flow of the MOG.

The at least one steering vane may comprise a second plurality of steering vanes configured to deflect the flow of the MOG in a primarily vertical direction.

The second plurality of steering vanes may comprise at least two steering vanes that are disposed on opposite vertical sides of the flow of the MOG.

The second plurality of steering vanes may comprise at least two steering vanes that are disposed on the same vertical side of the flow of the MOG in a side-by-side relation.

In accordance with a second aspect of the invention, a method of controlling a windrow profile is provided in an agricultural combine that is configured to make a windrow and having a windrow control circuit including at least one steering vane for directing a flow of MOG leaving the agricultural combine the method comprising steps of: electronically generating electronic data indicative of a profile of the windrow; electronically extracting at least one parameter indicative of the profile of the windrow; electronically comparing the at least one parameter indicative of the profile of the windrow with at least one parameter defining a reference windrow profile; and electronically controlling an actuator coupled to the at least one steering vane based upon results from the step of electronically comparing.

DETAILED DESCRIPTION OF THE PREFERRED EMBODIMENTS

In the discussion herein the terms "laterally", "side-to-side" and the like refer to a horizontal direction that extends generally perpendicular to a direction of travel of the agricultural combine through the field harvesting crops. In the discussion herein, the terms "forward", "front", and the like refer to a direction that is generally parallel to the direction of travel of the agricultural combine to the field harvesting crops.

Figure 1:
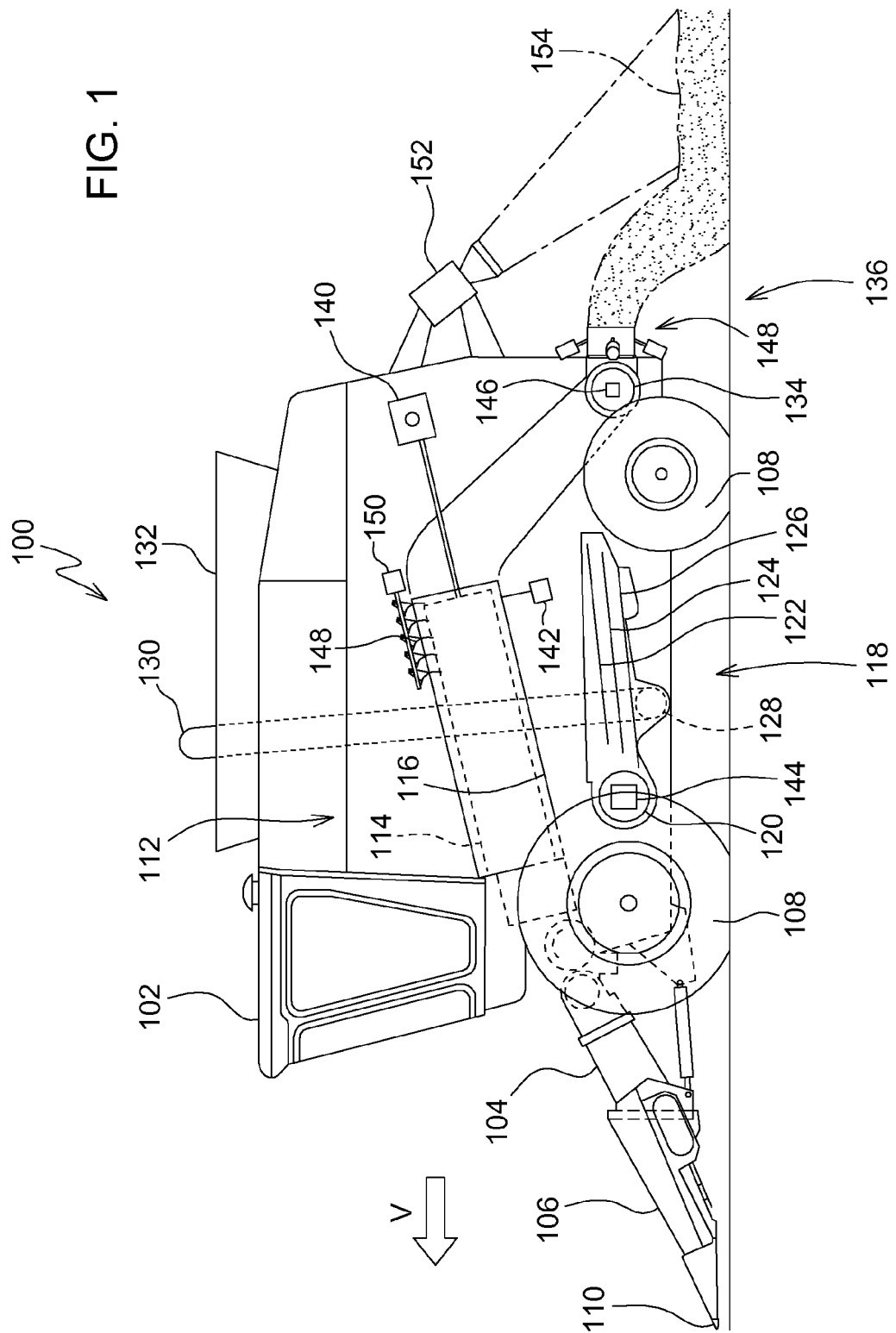
FIG. 1 is a side view of an agricultural combine in accordance with the present invention.

Referring now to FIG. 1, an agricultural combine 100 is shown that comprises a self-propelled harvesting vehicle 102, a feederhouse 104 pivotally coupled to the front of the self-propelled harvesting vehicle 102, and an agricultural harvesting head 106 supported on the front of the feederhouse 104.

The self-propelled harvesting vehicle 102 includes wheels 108 that support the self-propelled harvesting vehicle 102 and carry it over the field for harvesting in the direction "V". As the self-propelled harvesting vehicle 102 travels through the field harvesting crops, an elongate reciprocating knife 110 that extends across substantially the entire width of the agricultural harvesting head 106 engages the crop plants near their roots, severs the stalks of the crop plants, and deposits them on the agricultural harvesting head 106.

The agricultural harvesting head 106 carries the cut crop material laterally inward from both ends of the agricultural harvesting head 106 toward a central region of the agricultural harvesting head 106.

The conveyor (not shown) disposed in the feederhouse 104 carries the cut crop material upward, rearward, and into the self-propelled harvesting vehicle 102. The cut crop material is received in a threshing system 112 which comprises a rotor 114 that is rotated inside a concave 116. In the threshing system, the action of the rotor 114 passing closely to the concave 116 threshes the cut crop material permitting grain to fall through openings in the concave 116 and downward into a cleaning shoe 118.

The cleaning shoe 118 comprises a fan 120 that draws air from outside of the self-propelled harvesting vehicle 102 and conveys it rearward and upward through a sieve 122 and a chaffer 124 in the cleaning shoe. This airflow lifts and carries light MOG such as chaff, bits of leaves, and the like rearward between the rotor 114 and the concave 116.

The grain, now separated from the light MOG in the cleaning shoe 118, falls onto a pan 126 at the bottom of the cleaning shoe 118.

An auger 128 is disposed in a laterally extending trough formed in the pan 126. The auger 128 carries the grain laterally across the width of the self-propelled harvesting vehicle 102 to a vertical conveyor 130.

The vertical conveyor 130 receives the grain, and carries it upward. Vertical conveyor 130 deposits the grain in a grain tank or reservoir 132.

The MOG, now separated from the grain, is carried rearward between the rotor 114 and the concave 116. The MOG exits the threshing system 112 at the rear of the rotor 114 and the concave 116. The MOG is then carried downward until it reaches a rotary chopper 134. The rotary chopper 134 extends laterally and is configured to receive and chop the MOG. The now-chopped MOG leaves the rotary chopper 134 and is directed rearward through an aperture 136 at the rear of the self-propelled harvesting vehicle 102.

A plurality of steering vanes 138 are disposed adjacent to the aperture 136 to deflect the MOG as it exits the self-propelled harvesting vehicle 102. The steering vanes 138 are described in greater detail in conjunction with FIG. 2, below.

The rotor 114 is driven by a prime mover 140, which may be, for example, an electric motor or an internal combustion engine such as a gasoline engine or diesel engine.

An actuator 142 is provided that is coupled to the concave 116. The actuator 142 is configured to move the concave 116 up and down with respect to the rotor 114 to thereby change the relative spacing of the rotor 114 and the concave 116.

As the spacing of the rotor 114 in the concave 116 increases, the cut crop material is threshed less vigorously, and thus the length of the MOG (e.g. the straw) is increased on average. As the spacing of the rotor 114 and the concave 116 decreases, the cut crop material is threshed more vigorously, and the length of the MOG is decreased. Thus, we can vary the size of the MOG, and in particular the length of the straw, by varying the spacing of the rotor 114 and the concave 116.

A motor 144 is coupled to the fan 120 to drive the fan 120. By increasing the speed of the fan 120, the smaller particles of MOG can leave the cleaning shoe 118 at a higher rate of speed and thus can travel farther once they leave the self-propelled harvesting vehicle 102. Thus, by varying the speed of the fan 120, we can vary the distance traveled by the smaller MOG particles and thus the width of their distribution over the ground.

A motor 146 is coupled to the rotary chopper 134 to drive the rotary chopper 134. By increasing the speed of the rotary chopper 134, the MOG is transmitted through the aperture 136 with greater force, and greater width. Therefore, by changing the speed of the rotary chopper 134, the width of the windrow can be increased or decreased.

Steering vanes 148 are provided at the rear of the rotor 114 to steer the MOG leaving the rotor 114 as it approaches the rear end of the rotor 114. The steering vanes 148 are adjustable, and are coupled to an actuator 150. The actuator 150 varies the angular position of the steering vanes 148 with respect to the rotor 114, and therefore varies the amount of time that the MOG is retained between the rotor 114 and the concave 116.

As the angular position of the steering vanes 148 is varied, the MOG is held between the rotor 114 and the concave 116 a variable length of time, thereby causing the MOG to be threshed more thoroughly or less thoroughly. The longer the MOG is kept between the rotor 114 and the concave 116, the smaller the particles of MOG that leave the rotor 114 and the concave 116 and are carried to the rotary chopper 134.

Figure 3:
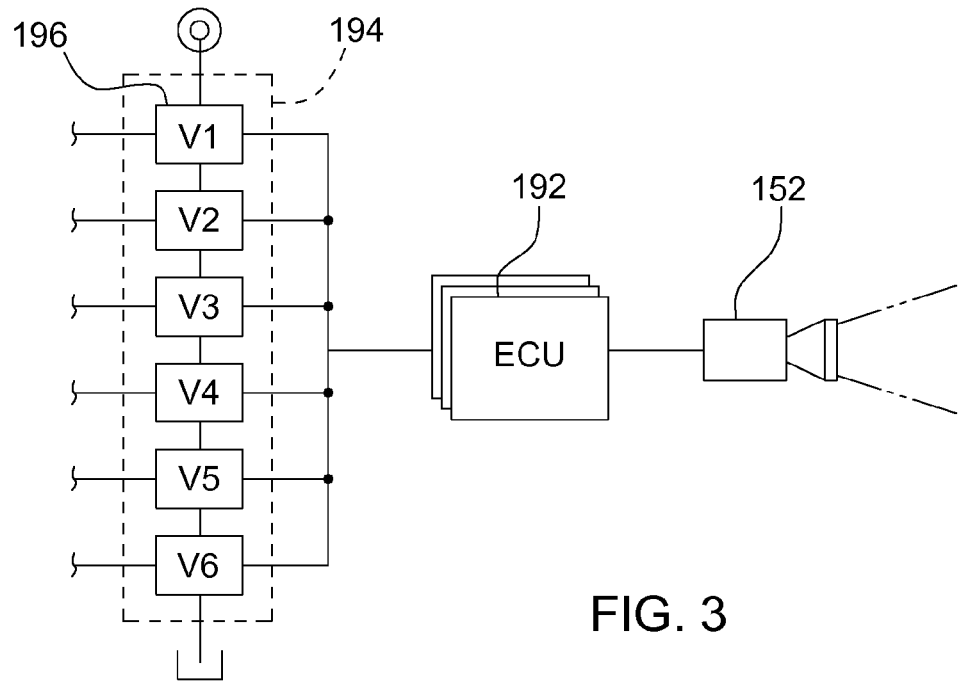
FIG. 3 is a schematic representation of a windrow control circuit that provides for the dynamic control of the contours of the windrow as the agricultural combine is traveling through the field.

A sensor 152 is fixed to the rear of the self-propelled harvesting vehicle 102 and is directed toward the windrow 154 created by the self-propelled harvesting vehicle 102. The sensor 152 is configured to receive an image of the windrow 154 and to transmit that image to an electronic control unit (ECU) 192 (FIG. 3).

Figure 2:
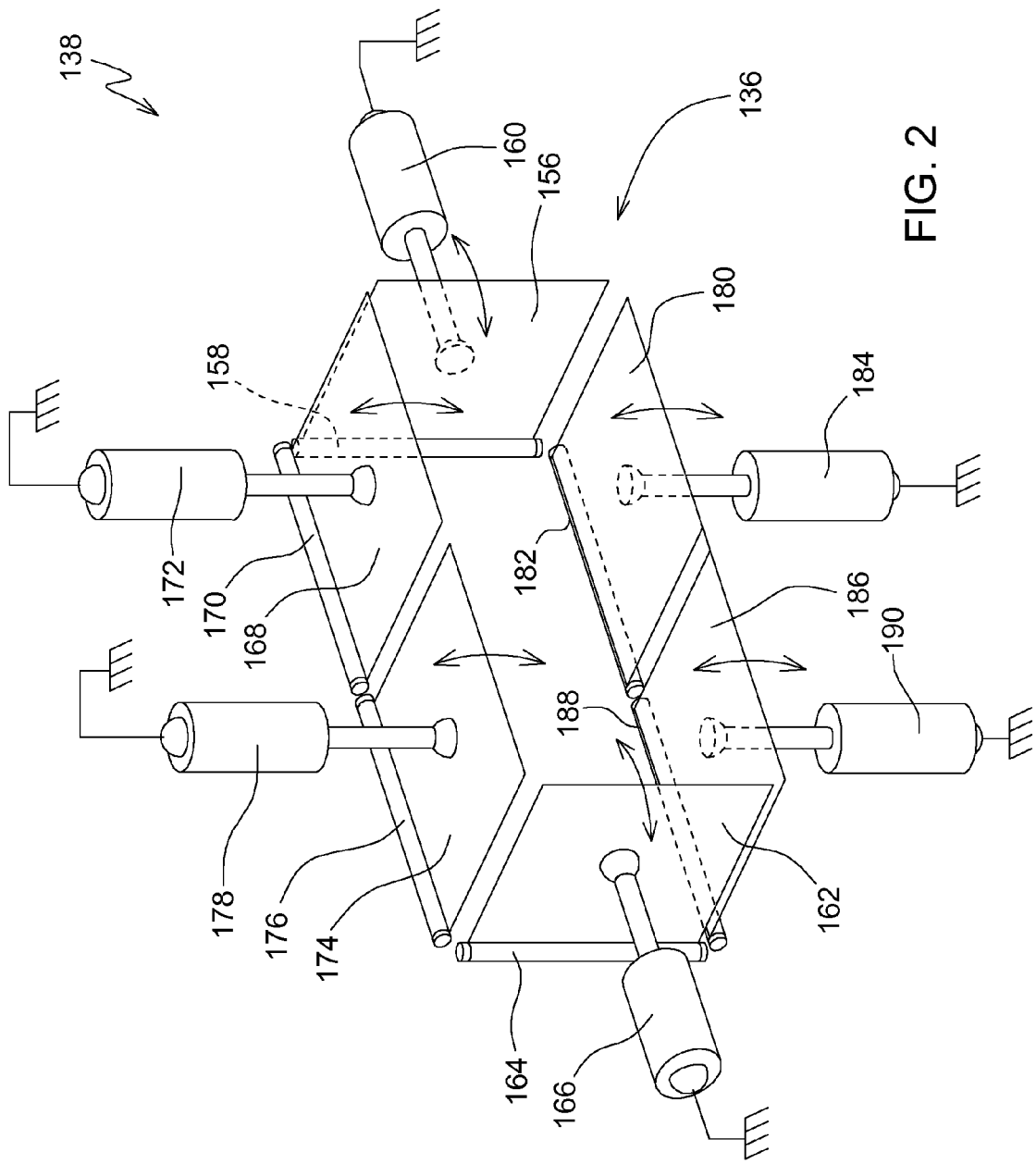
FIG. 2 is a perspective view of the rear of the agricultural combine of FIG. 1 showing the arrangement of the steering mechanisms that vary the contours of the windrow.

In FIG. 2, the steering vanes 138 of FIG. 1 are shown in greater detail. A right side steering vane 156 is generally planar and is pivotally coupled to the rear of the agricultural combine 100 adjacent to the right side of the aperture 136. The right side steering vane 156 is supported on a hinge 158 to pivot about a generally vertical axis. The right side steering vane 156 is generally planar and oriented vertically and fore and aft such that pivoting of the right side steering vane 156 about its generally vertical axis will deflect the right side of the flow of MOG leaving the agricultural combine 100. By varying the position of the right side steering vane 156, the right side (the right edge) of the windrow 154 can be moved to the left and to the right.

The right side steering vane 156 is driven by an actuator 160, here shown as a hydraulic cylinder. One end of the actuator 160 is pivotally coupled to the right side steering vane 156. The other end of the actuator is pivotally coupled to the chassis of agricultural combine 100 (indicated by the ground symbol in the Figure).

When the actuator 160 extends, it pivots the right side steering vane 156 inward toward the aperture 136. This movement deflects the MOG flow exiting the agricultural combine 100 through aperture 136, and moves the right edge of the MOG flow toward the left, thus making the windrow 154 narrower.

When the actuator 160 retracts, it pivots the right side of the right side steering vane 156 outward away from the aperture 136 and permits the right edge of the MOG flow to move toward the right, thus making the windrow 154 broader.

A left side steering vane 162 is generally planar and is pivotally coupled to the rear of the agricultural combine 100 adjacent to the left side of the aperture 136. The left side steering vane 162 is supported on a hinge 164 to pivot about a generally vertical axis. The left side steering vane 162 is generally planar and oriented vertically and fore and aft such that pivoting of the left side steering vane 162 about its generally vertical axis (defined by hinge 164) will deflect the left side of the flow of MOG leaving the agricultural combine 100. By varying the position of the left side steering vane 162, the left side (the left edge) of the windrow 154 can be moved to the left and to the right.

The left side steering vane 162 is driven by an actuator 166, here shown as a hydraulic cylinder. One end of the actuator 166 is pivotally coupled to the left side steering vane 162. The other end of the actuator is pivotally coupled to the chassis of agricultural combine 100 (indicated by the ground symbol in the Figure).

When the actuator 166 extends, it pivots the left side steering vane 162 laterally inward toward the aperture 136. This movement deflects the MOG flow exiting the agricultural combine 100 through aperture 136, and moves the left edge of the MOG flow toward the right, thus making the windrow 154 narrower.

When the actuator 166 retracts, it pivots the left side steering vane 162 laterally outward away from the aperture 136 and moves the left edge of the MOG flow toward the right, thus making the windrow 154 broader.

An upper right steering vane 168 is generally planar and is pivotally coupled to the rear of the agricultural combine 100 adjacent to the right side top edge of the aperture 136. The upper right steering vane 168 is supported on a hinge 170 to pivot about a generally horizontal axis. The upper right steering vane 168 is generally planar and extends generally parallel to the ground such that pivoting of the upper right steering vane 168 about a generally horizontal axis (defined by hinge 170) will deflect the top right flow of MOG leaving the agricultural combine 100. By varying the position of the upper right steering vane 168, the thickness or height of the right side of the windrow 154 can be increased and decreased.

The upper right steering vane 168 is driven by an actuator 172, here shown as a hydraulic cylinder. One end of the actuator 172 is pivotally coupled to the upper right steering vane 168. The other end of the actuator is pivotally coupled to the chassis of agricultural combine 100 (indicated by the ground symbol in the Figure).

When the actuator 172 extends, it pivots the upper right steering vane 168 downward toward the aperture 136. This movement deflects the MOG flow exiting the agricultural combine 100 through aperture 136, and moves the upper left flow of MOG downward thus reducing the thickness and height of the right side of the windrow 154 and making the windrow thinner.

When the actuator 172 retracts, it pivots the upper right steering vane 168 upward away from the aperture 136 and moves the upper right MOG flow upward thus increasing the thickness and height of the right side of the windrow 154 and making the windrow thicker (in a vertical direction) and taller.

An upper left steering vane 174 is constructed the same as the upper right steering vane 168, and is similarly supported on a hinge 176 and is moved by an actuator 178. The upper left steering vane 174 functions identically to the upper right steering vane 168 using its own hinge and actuator.

When it is moved, however, rather than deflecting the top of the flow of MOG leaving the aperture 136 on the right hand side of the agricultural combine 100, it deflects the top of the flow of MOG leaving the aperture 136 on the left-hand side of the agricultural combine 100.

The actuator 178 is pivotally coupled to the upper left steering vane 174 at one end and is pivotally coupled to the chassis of agricultural combine 100 (indicated by the ground symbol in the Figure) at the other end.

A lower right steering vane 180 is supported on the combine to pivot about a hinge 182 and is controlled by an actuator 184. The lower right steering vane 180 is constructed identically to the upper right steering vane 168 but is disposed on the opposite side of the aperture 136 as the upper right steering vane 168.

The actuator 184 is pivotally coupled to the lower right steering vane 180 at one end and is pivotally coupled to the chassis of agricultural combine 100 (indicated by the ground symbol in the Figure) at the other end.

When the actuator 184 is extended, it pivots the lower right steering vane 180 upward and into the flow of MOG leaving the combine on the underside of the flow of MOG, thereby deflecting the flow of MOG upward. When the actuator 184 is retracted, it pivots the lower right steering vane 180 downward and away from the flow of MOG leaving the combine thereby permitting the flow of MOG to expand downward and increasing the overall thickness of the flow of MOG on the right side, and therefore the thickness and height of the windrow 154 on the right side when the MOG is deposited on the ground.

A lower left steering vane 186 is supported on the combine to pivot about a hinge 188 and is controlled by an actuator 190. The lower left steering vane 186 is constructed identically to the upper left steering vane 174 but is disposed on the opposite side of the aperture 136 as the upper left steering vane 174.

The actuator 190 is pivotally coupled to the lower left steering vane 186 at one end and is pivotally coupled to the chassis of the agricultural combine 100 (indicated by the ground symbol in the figure) at the other end.

When the actuator 190 is extended, it pivots the lower left steering vane 186 upward and into the flow of MOG leaving the combine on the underside of the flow of MOG, thereby deflecting the flow of MOG upward. When the actuator 190 is retracted, it pivots the lower left steering vane 186 downward and away from the flow of MOG leaving the combine thereby permitting the flow of MOG to expand downward and increasing the overall thickness of the flow of MOG on the left side, and therefore the thickness and height of the windrow 154 on the left side when the MOG is deposited on the ground.

The right side steering vane 156, the left side steering vane 162, the upper right steering vane 168, the upper left steering vane 174, the lower right steering vane 180, and the lower left steering vane 186 can both vary the thickness or height of the windrow on the ground, and vary the width of the windrow on the ground, and vary the left to right lateral position of the windrow on the ground.

The windrow can be shifted to the left by pivoting the right side steering vane 156 inward toward the aperture 136, and pivoting the left side steering vane 162 outward with respect to the aperture 136.

The windrow can be shifted to the right by pivoting the left side steering vane 162 inward toward the aperture 136, and pivoting the left side steering they 156 outward with respect to the aperture 136.

The windrow can be reduced in overall width by pivoting either one or both of the right side steering vane 156 and the left side steering vane 162 inward toward the aperture 136.

The windrow can be increased an overall width by pivoting either one or both of the right side steering vane 156 and the left side steering vane 162 outward away from the aperture 136.

In FIG. 3, a windrow control circuit is illustrated comprising the sensor 152, ECU 192, and actuator controller 194. Actuator controller 194 is comprised of valves 196. Each valve 196 is coupled to and controls the position of a corresponding one of the vane actuators (i.e. the actuator 160, the actuator 166, the actuator 172, the actuator 178, the actuator 184, and the actuator 190). The ECU 192 is coupled to valves 196 to control the position of the vane actuators, and thereby to control the position of the steering vanes (i.e. the right side steering vane 156, the left side steering vane 162, the upper right steering being 168, the upper left steering vane 174, the lower right steering vane 180, and the lower left steering vane 186).

The ECU 192 is configured to control the position of the steering vanes by receiving sensor data from the sensor 152 that is indicative of the profile of the windrow 154, then extracting profile data from the data indicative, then comparing the extracted profile data with reference profile data, then controlling the vane actuators to change the direction of flow of MOG leaving the combine such that the profile of the windrow 154 corresponds to the reference profile data. This is best explained with reference to FIG. 4.

The sensor 152 may be, without limitation, a video camera, a CCD camera, a laser line scanner, a scanning laser rangefinder or other device that will generate two-dimensional (i.e. vertical) data indicative of the thickness or height of the windrow.

In one arrangement, a laser rangefinder indicating time of flight between a laser beam and a reflective surface may be employed.

In another arrangement, a scanning laser beam may be deflected across the surface in a generally vertical direction to generate reflective laser light, and a CCD camera may be disposed at an angle to the scanning laser beam two receive the reflected laser light.

Figure 4:
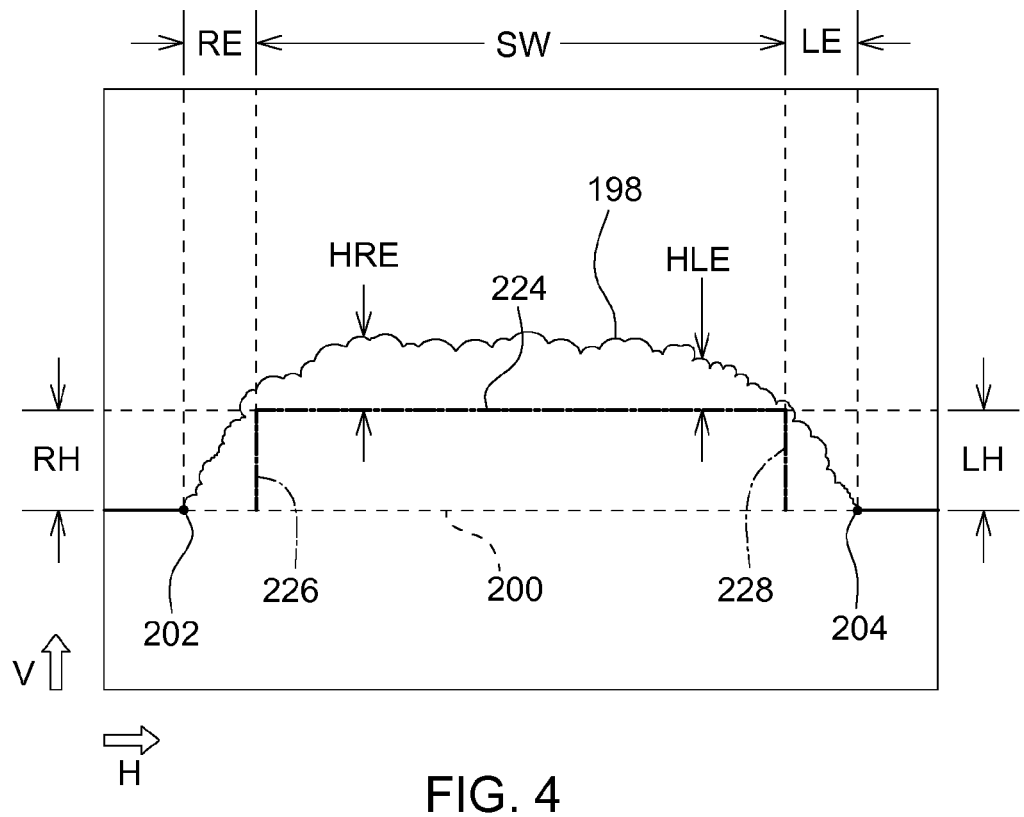
FIG. 4 is a representative image of a typical windrow sensed by the sensor of FIG. 2.

FIG. 4 illustrates the type of data that may be generated in the form of a two-dimensional image.

In the arrangement of FIG. 4, the sensor 152 in the form of a scanning laser rangefinder is directed across the surface of the windrow to generate a plurality of points indicating the distance to the windrow. This plurality of points, when received and assembled by the ECU 192, defines a line, shown in FIG. 3 as line 198. The left end of the line 198 and the right end of the line 198 indicate places where there is no windrow.

The ECU 192 is configured to receive this data from the sensor 152 and to identify the straight line segments at the end of the line 198. ECU 192 is configured to extend the straight-line segments at each end of the line 198 and determine a virtual line 200 that indicates the height of the surface of the ground on which the windrow 154 is deposited. The virtual line 200 establishes the plane of the ground (ground plane) underneath the windrow 154

Having established this ground plane, the ECU 192 is configured to determine the actual thickness or height of the windrow, which is equivalent to the distance between the line 198 and the line 200 in the vertical direction "V".

Having established this ground plane, the ECU is configured to determine the actual width of the windrow, which is the distance between the right side horizontal endpoint 202 and the left side horizontal endpoint 204 of the windrow 154. These endpoints are calculated at the point at which the line 198 defining the upper surface of the windrow 154 intersects the line 200 (the ground plane).

The ECU 192 stores a reference windrow profile in its internal memory circuits. The reference window profile is a collection of data that at least a portion of a desired cross-sectional profile of the windrow in a direction generally perpendicular to the longitudinal extent of the windrow 154. The at least a portion of the desired cross-sectional profile may comprise a thickness or height, a width, or a curvature of at least a portion of the windrow.

The reference windrow profile described herein is expressed as a plurality of windrow thicknesses or heights and widths extending across the width of the windrow in the illustrated case here, the reference windrow profile is defined by a windrow width ("SW" in FIG. 4) a windrow thickness or height at the right end of the windrow ("RH" in FIG. 4), and windrow thickness or height at the left end of the windrow ("LH" in FIG. 4).

The ECU 192 is configured to compare the reference window profile with the actual window profile (which is extracted from the data provided by the sensor 152). The ECU 192 is configured to signal the steering gain actuators to change the profile of the windrow in response to this comparison such that the actual window profile will approach the reference window profile.

Figure 5:
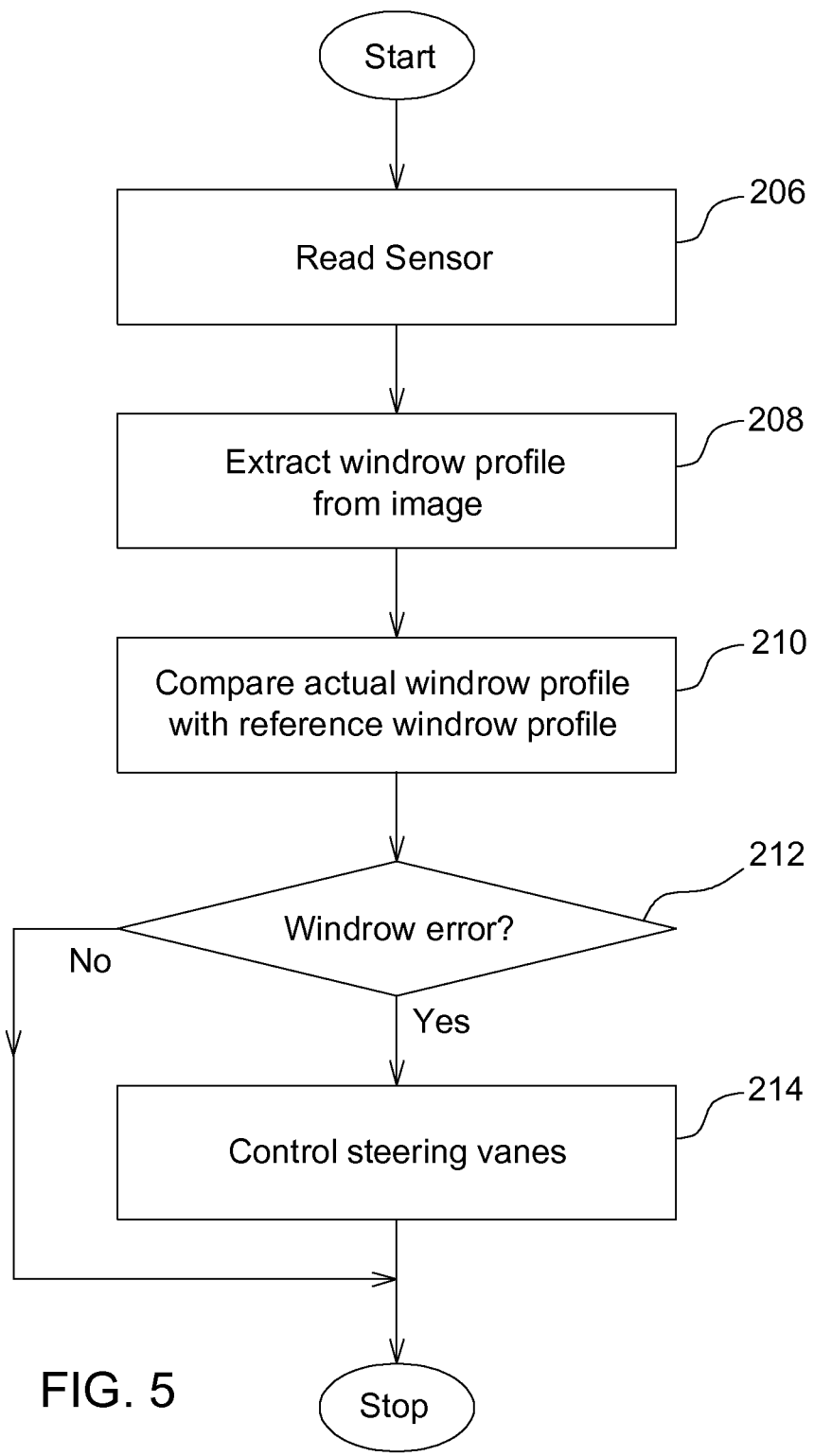
FIG. 5 is a flowchart of steps performed by the windrow control circuit to control the windrow profile.

Referring to FIG. 5, in step 206 the ECU 192 reads the sensor 152 and retrieves data indicative of the actual windrow profile. In step 208, the ECU 192 extracts the actual window profile from the data indicative of the actual windrow profile. In step 210, the ECU 192 compares the actual window profile with the reference windrow profile. In step 212, the ECU 192 determines whether a windrow error exists. A windrow error exists whenever one of the data indicative of the reference window profile disagrees with the corresponding data extracted from the actual window profile.

For example, and referring to FIG. 4, the windrow profile includes windrow width "SW", a left side windrow thickness or height "LH" and a right side windrow thickness or height "RH". The ECU 192 successively compares each of these reference windrow profile data with the corresponding actual window profile data and determines whether any one of them indicates an error. In the example of FIG. 4, the ECU 192 determines that there is a windrow width error of "RE" on the right side of the windrow, a windrow error of "LE" on the left side of the windrow, a windrow thickness or height error of "HRE" on the right side of the windrow, and windrow thickness or height error of "HLE" on the left side of the windrow. In short, the ECU 192 discovers that the windrow is too wide on both the left and right hand sides of the windrow, and is too high on both the left and right hand sides of the windrow.

Having determined that at least one windrow profile error (and in this case four of them) exist, and referring back to FIG. 5, the ECU 192 proceeds to step 214. In step 214, the ECU 192 calculates the desired control actions it should take to control the steering vanes and transmit signals to the actuator controller 194 (in this case, the valves 196) to take the appropriate corrective action. ECU 192 can calculate the desired control actions in a variety of ways. It may use an equation or equations with the windrow profile errors as inputs from which the appropriate control action can be calculated. Alternatively, it may use the windrow profile errors as an entry into a lookup table that returns a value indicative of the appropriate control action. Since there is a plurality of steering vanes, with a corresponding plurality of steering vane actuators, the ECU 192 is configured to generate a plurality of control signals independently of each other to permit errors in different portions of the windrow to be corrected independently of the other errors.

Using the example of FIG. 4 to illustrate the control action would be taken by the ECU 192, in step 214 the ECU 192 is configured to transmit a control signal to the valve 196 that controls the actuator 160, thereby commanding the actuator 160 to extend, thereby deflecting the flow of MOG leaving the right side of the aperture 136 inward (i.e. to the left). This will reduce the right side windrow profile error "RE".

In step 214 the ECU 192 is also configured to transmit a control signal to the valve 196 that controls the actuator 166, thereby commanding the actuator 166, commanding the actuator 166 to extend, thereby deflecting the flow of MOG leaving the left side of the aperture 136 inward (i.e. to the right). This will reduce the left side windrow profile error "LE".

In step 214 the ECU 192 is also configured to transmit a control signal to the valve 196 that controls the actuator 172, thereby commanding the actuator 172 to extend, thereby deflecting the flow of MOG leaving the left side of the aperture 136 inward (i.e. downward). This will reduce the right side windrow thickness or height profile error "HRE".

In step 214 the ECU 192 is also configured to transmit a control signal to the valve 196 that controls the actuator 178, thereby commanding the actuator 178 to extend, thereby deflecting the flow of MOG leaving the left side of the aperture 136 inward (i.e. downward). This will reduce the left side windrow thickness or height profile error "HLE".

In an alternative arrangement, the ECU 192 can extend the actuator 184 in addition to (or in place of) extending the actuator 172 and the ECU 192 can extend the actuator 190 in addition to (or in place of) extending the actuator 178.

The example of FIG. 3 was used to illustrate the operations of step 214. It should be understood that in some cases the opposite errors may appear: the actual windrow profile may be narrower than the reference windrow profile on either the left side or the right side. In this case, the ECU 192 is configured to retract the actuator 166 or the actuator 160, respectively, in order to increase the width of the actual windrow profile. Likewise, the actual windrow profile may be higher than the reference windrow profile on either the left side or the right side. In this case, the ECU 192 is configured to retract the actuator 178 or the actuator 172, respectively, in order to increase the thickness or height of the actual windrow profile.

Likewise, when increasing the thickness or height, the ECU 192 in an alternative arrangement can retract the actuator 184 in addition to (or in place of) retracting the actuator 172 and the ECU 192 can retract the actuator 190 in addition to (or in place of) retracting the actuator 178.

The ECU 192 comprises one or more microprocessor-based electronic control units that include an arithmetic logic unit (ALU) as well as digital memory circuits for storing ALU instructions and working variables. The ECU 192 may be a single microprocessor-based electronic control unit programmed to perform all of the functions or it may be multiple microprocessor-based electronic control units, each individual microprocessor-based electronic control unit being programmed to perform a subset of the functions described herein.

In the case of the ECU 192 comprising multiple microprocessor-based electronic control units, the multiple microprocessor-based electronic control units are coupled together in a network and communicate with each other to collectively perform the functions described herein.

Each of these multiple microprocessor-based electronic control units may be connected to different sensors and actuators described herein.

For example, one of the microprocessor-based electronic control units may be connected to the sensor 152, and another of the microprocessor-based electronic control units may be connected to one, or more, or all of the valves 196 that collectively comprise the actuator controller 194.

The ECU 192 does not necessarily control both width errors and thickness (or height) errors of the windrow. Both cases are provided for completeness of description herein, but are not both required In some arrangements, therefore, the ECU 192 may be configured to control the thickness or height of the windrow and not the width of the windrow. In this case, the parameters of the reference windrow profile would be thickness or height parameters alone and not width parameters. This is preferred in situations where the operator wishes a consistent windrow thickness or height and is not concerned about the width the windrow itself. This will typically occur when the farmer wishes to dry the windrow in as short a time as possible. Rather than having some regions of the window thicker (or higher) than other regions, which would inhibit consistent windrow drying across the width of the windrow, the operator can set the ECU 192 to maintain a consistent thickness or height of the windrow while not controlling for, and indeed permitting the windrow width to change. The ECU 192 will not calculate windrow width errors ("RE" and "HE"), but will only calculate and control the windrow thickness or height errors ("HRE" and "HLE").

In other arrangements, the ECU 192 may be configured to do the opposite: to control the width of the windrow and not the thickness or height of the windrow. In this case, the parameters of the reference windrow profile would be width parameters alone, and not the thickness or height parameters. This will typically occur in situations when the farmer intends to subsequently use a round baler to harvest the windrow. To form a quality round bale, the windrow width is preferably maintained constant. If the windrow is narrower than the width of the round bale, one side or the other of the round bale will receive insufficient MOG, and will not be tightly compacted. If this happens, one end of the bale will be formed loosely, relatively uncompacted, and the loosely baled MOG will fall out of the end of the bale when the bale is handled. For this reason, the ECU 192 may be configured to maintain the width of the windrow constant while not controlling the thickness or height of the windrow. The ECU 192 will not calculate and control the windrow thickness or height errors ("HRE" and "HLE"), but will only calculate and control the windrow width errors ("RE" and "LE").

The ECU 192 executes the steps in FIG. 5 in a continuous loop. As soon as the ECU 192 executes step 214, it returns to step 206 and begins again. ECU 192 repeats the steps of FIG. 5 every 50-250 ms.

The ECU 192 may be configured to dynamically change the reference windrow profile during harvesting based upon signals it receives from the sensor 152. This is beneficial in situations where in which the volume of MOG changes substantially as the agricultural combine 100 travels through the field harvesting crop. Because the volume changes, the actual windrow profile of the windrow will also change. As the volumetric flow rate of MOG out of the aperture 136 increases, the cross-sectional area of the actual windrow profile will increase. As the volumetric flow rate of MOG out of the aperture 136 decreases, the cross-sectional area of the actual windrow profile will decrease. When the cross-sectional area of the actual windrow profile increases, it may be impossible to maintain a fixed width and a fixed thickness or height as indicated by a reference windrow profile.

This increasing or decreasing cross-sectional area of the actual windrow profile may be a problem when the windrow is being formed for pickup by a round baler. As explained above, round bales need a consistent windrow width in order to form an evenly compressed bale. It is also beneficial that the windrow have a consistent thickness or height across its width as well.

One way to solve this problem is by using a reference windrow profile that can be automatically varied as the sensed volumetric flow rate of MOG through aperture 136 varies. In this arrangement, the ECU 192 can periodically recalculate the thickness or height of the windrow in the reference windrow profile, changing the thickness or height of the windrow in the reference windrow profile as necessary to accommodate the increased volumetric flow rate of MOG through the aperture 136 while keeping the width of the windrow constant. This is particularly beneficial when the system herein is maintaining a constant width in order to properly feed a round baler, for example.

Another way to solve this problem is by having the ECU 192 periodically recalculate the width of the windrow in the reference windrow profile, changing the width of the reference windrow profile as necessary to accommodate the increased by a metric flow rate of MOG through the aperture 136 while keeping the thickness or height of the windrow constant. This is particularly beneficial when the system herein is maintaining a constant thickness in order to ensure that the windrow dries evenly across its width, for example.

To accommodate this changing volumetric flow rate of MOG transmitted through the aperture 136 (and thus the changing cross-sectional area of the windrow itself), the ECU 192 is configured to automatically recalculate parameters (e.g. the windrow width or the windrow thickness or height) that define the reference windrow profile to accommodate this changing volume.

To do this, the ECU 192 determines the actual cross-sectional area of the windrow and changes at least one of the reference windrow profile parameters used in step 210 of FIG. 5 based upon the cross-sectional area of the windrow.

Figure 6:
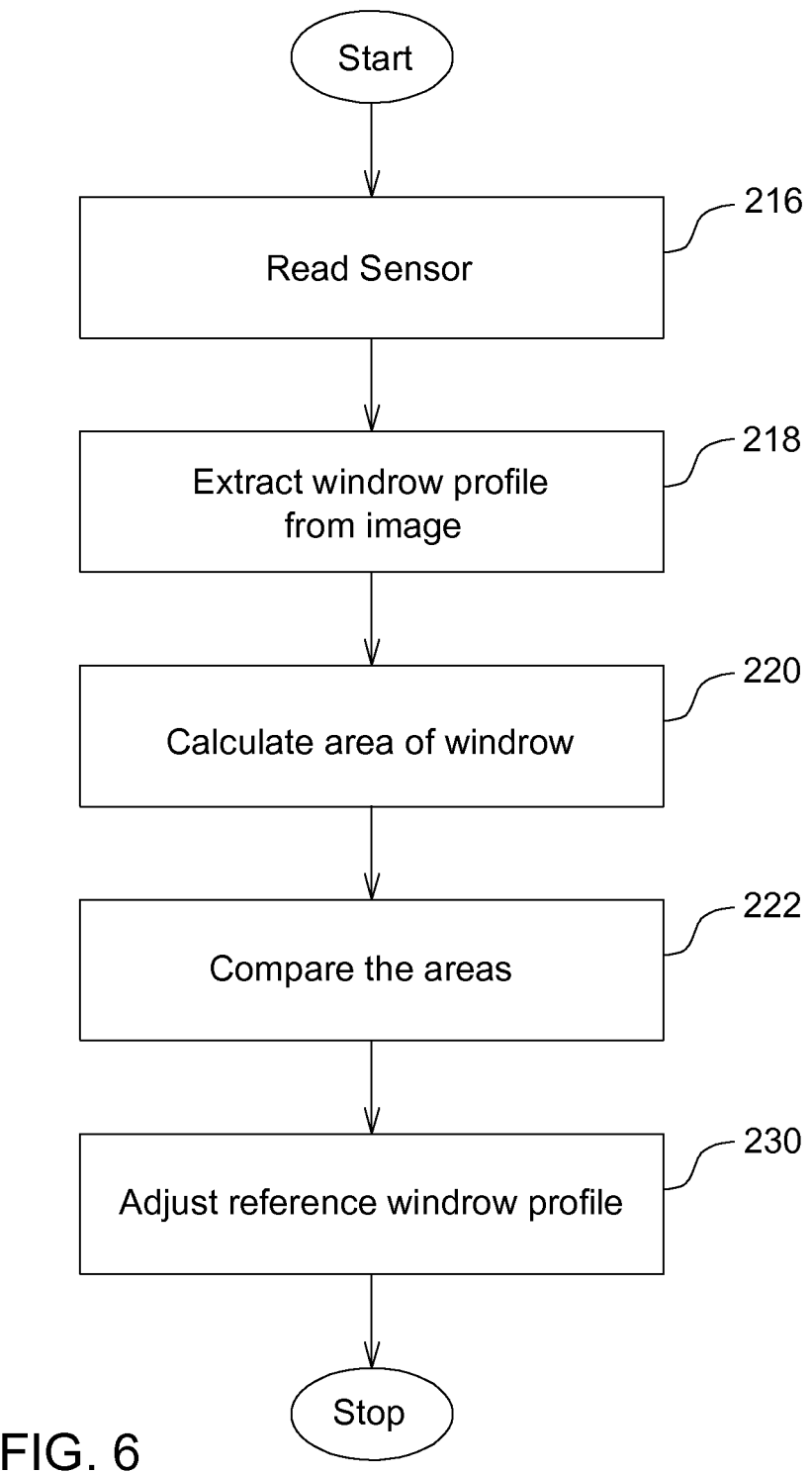
FIG. 6 is a flowchart of steps performed by the windrow control circuit to adjust the reference windrow profile used in the steps of FIG. 5.

FIG. 6 indicates how the ECU 192 makes this automatic adjustment of the reference windrow profile. In step 216, the ECU 192 reads the sensor 152. In step 218, the ECU 192 extracts the actual windrow profile from the data the ECU 192 receives from the sensor 152. This is the same process as described in steps 206 and 208 herein.

Having extracted the actual windrow profile, the ECU 192 then calculates the cross-sectional area of the windrow in step 220. The cross-sectional area of the windrow can be seen in FIG. 4 as the area between the line 200 (i.e. the ground plane) and the line 198.

In step 222, the ECU 192 compares the cross-sectional area of the windrow to the area of the windrow defined by the reference windrow profile. The area of the windrow defined by the reference windrow profile is equal to the area between the ground plane (shown as line 200 in FIG. 4) and lines 224, 226, and 228 (FIG. 4). Line 224 indicates the thickness or height of the windrow defined by the reference windrow profile. Line 226 indicates the right hand side of the windrow defined by the reference windrow profile. Line 228 indicates the left-hand side of the windrow defined by the reference windrow profile.

In step 230, the ECU 192 adjusts the reference windrow profile to accommodate the increased (or decreased) volumetric flow rate of MOG out of aperture 136. In the example given above regarding the round baler, it is important that the width remain constant so the entire width of the windrow is received properly into the pickup of the round baler that picks up the windrow. It is also important that the thickness or height across the width of the windrow may remain constant so the round balers wrapped with even MOG compression across the entire width of the round bale. In this illustrative case, the ECU 192 is configured to increase the thickness or height on the right side of the windrow ("RH") and to increase the thickness or height on the left side of the windrow ("LH") an equal amount to maintain a constant windrow thickness or height across the width of the windrow, yet to permit this windrow thickness or height to increase or decrease as the volumetric flow rate of MOG leaving the aperture 136 increases or decreases. In an alternative arrangement, however, the ECU 192 can be configured to adjust the reference windrow profile by maintain a constant thickness, and increasing or decreasing the width ("SW") of the reference windrow profile to accommodate the changing volumetric flow rate of MOG leaving the aperture 136.

Thus, the ECU 192 is configured to adjust one or more parameters (e.g. width or thickness or height) of the reference windrow profile in response to changing volumetric flow rates of MOG leaving the aperture that are sensed by sensor 152. This adjustable parameter can be a width parameter or thickness or height parameter. It could be both a width and a thickness or height. It could be a plurality of widths. It could be a plurality of thickness or heights.

ECU 192 preferably executes the steps in FIG. 6 automatically and repeatedly on a predetermined time intervals, for example every 50-250 ms.

The apparatus and methods described above are just a few illustrative examples of the many ways in which the invention may be practiced. The scope of the invention is not limited to these examples but encompasses any arrangement that falls within the scope of the claims herein.

For example, an arrangement of six steering vanes is been disclosed in this application. There may more or fewer vanes provided. There may be left and right side vanes. There may be up and down vanes. Vanes may be provided on either side of the flow as shown in the images herein. Alternatively vanes may be provided that extend down the middle of the flow and thus divide the flow into two or more parts.

The vanes at the aperture 136 in the present application are all independently movable by the ECU 192. In another arrangement two or more vanes may be coupled together to be driven by a common actuator and thus cannot be moved independently of each other.

The vanes at the aperture 136 are shown pivoting along one edge. In another arrangement, the vanes may pivot at a different location, such as in the middle (or more toward the middle) of the vane. This has the advantage of balancing the forces applied to the vane and thus requiring an actuator.

The vanes at the aperture 136 are shown extending rearward from the rear of the combine. In another arrangement, vanes can be disposed inside the body of the combine and steer the MOG before it reaches the aperture 136.

The aperture 136 is shown as a generally rectangular hole that opens directly to the rear and faces the rear. Alternatively, the aperture 136 can have any of a variety of shapes. The aperture 136 can face downwards. The aperture 136 can face upward.

The vanes at the aperture 136 are shown as generally planar. They do not have to be planar. They can be curved, arched, twisted, or otherwise configured. They can have ridges, grooves, slats, or other surface configurations.

We claim:

1. An agricultural combine (100) having a windrow control circuit, comprising:
   a self-propelled harvesting vehicle (102) configured to harvest crops, separate grain from material other than grain, and deposit material other than grain on ground in a windrow (154);
   a sensor (152) mounted on the self-propelled harvesting vehicle (102), wherein the sensor (152) is configured to sense a profile of the windrow (154);
   at least one steering vane (156, 168, 174, 162, 180, 186) disposed to deflect a flow of the material other than grain leaving the self-propelled harvesting vehicle (102);
   at least one actuator (160, 172, 178, 166, 190, 184) coupled to the at least one steering vane (156, 168, 174, 162, 180, 186) to move the at least one steering vane (156, 168, 174, 162, 180, 186) relative to the self-propelled harvesting vehicle (102) and deflect the flow of the material other than grain leaving the self-propelled harvesting vehicle (102); and
   at least one electronic control unit (192) coupled to the sensor (152) and coupled to the at least one actuator (160, 172, 178, 166, 190, 184);
   wherein the at least one electronic control unit (192) is configured to receive data indicative of a profile of the windrow (154) from the sensor (152), wherein the at least one electronic control unit (192) is configured to perform a comparison of the data indicative of the profile of the windrow (154) and at least one parameter defining a reference windrow profile, and wherein the at least one electronic control unit (192) is configured to drive the at least one actuator (160, 172, 178, 166, 190, 184) in response to the comparison.

2. The agricultural combine (100) of claim 1, wherein the sensor (152) is selected from a group comprising a camera, a laser line scanner or a scanning laser rangefinder.

3. The agricultural combine (100) of claim 1, wherein the at least one electronic control unit (192) is further configured to extract at least one parameter from the data indicative of the profile of the windrow (154), and further wherein the at least one parameter is selected from a windrow thickness or height and a windrow width.

4. The agricultural combine (100) of claim 1, wherein the at least one actuator (172, 178, 180, 186) is configured to at least vertically deflect the flow of the material other than grain.

5. The agricultural combine (100) of claim 1, wherein the at least one actuator (166, 160) is configured to at least horizontally deflect the flow of the material other than grain.

6. The agricultural combine (100) of claim 3, wherein at least one parameter defining a reference windrow profile is selected from a group comprising a windrow thickness or height (RH, LH) and a windrow width (SW).

7. The agricultural combine (100) of claim 3, wherein the at least one parameter defining a reference windrow profile comprises a first windrow thickness or height (RH) and a second windrow thickness or height (LH).

8. The agricultural combine (100) of claim 1, wherein the at least one electronic control unit (192) is configured to change the at least one parameter defining the reference windrow profile in response to changes in the data indicative of a profile of the windrow (154).

9. The agricultural combine (100) of claim 8, wherein the at least one parameter defining the reference windrow profile is selected from a windrow thickness or height and a windrow width.

10. The agricultural combine (100) of claim 1, wherein the at least one steering vane (156, 162) comprises a first plurality of steering vanes (156, 162) configured deflect the flow of the material other than grain in a primarily horizontal direction.

11. The agricultural combine (100) of claim 10, wherein the first plurality of steering vanes (156, 162) are independently positionable by the at least one electronic control unit (192).

12. The agricultural combine (100) of claim 10, wherein the first plurality of steering vanes (156, 162) are disposed on opposing horizontal sides of the flow of the material other than grain.

13. The agricultural combine (100) of claim 1, wherein the at least one steering vane (168, 174, 180, 186) comprises a second plurality of steering vanes (168, 174, 180, 186) configured to deflect the flow of the material other than grain in a primarily vertical direction.

14. The agricultural combine (100) of claim 13, wherein the second plurality of steering vanes (168, 174, 180, 186) comprises at least two steering vanes that are disposed on opposite vertical sides of the flow of the material other than grain.

15. The agricultural combine (100) of claim 13, wherein the second plurality of steering vanes (168, 174, 180, 186) comprises at least two steering vanes that are disposed on the same vertical side of the flow of the material other than grain in a side-by-side relation.

16. In an agricultural combine (100) configured to make a windrow and having a windrow control circuit comprising at least one steering vane for directing a flow of material other than grain leaving the agricultural combine (100), a method of controlling a windrow profile comprising steps of:
   electronically generating electronic data indicative of a profile of the windrow;
   electronically extracting at least one parameter indicative of the profile of the windrow;
   electronically comparing the at least one parameter indicative of the profile of the windrow with at least one parameter defining a reference windrow profile; and
   electronically controlling an actuator coupled to the at least one steering vane based upon results from the step of electronically comparing.

\* \* \* \* \*